United States Patent

[11] 3,624,020

| [72] | Inventors | Wolfgang Klebert<br>Leverkusen;<br>Karl Schafer, Krefeld; Wolfram von<br>Langenthal, Cologne-Bickendorf, all of<br>Germany |
|---|---|---|
| [21] | Appl. No. | 671,153 |
| [22] | Filed | Sept. 27, 1967 |
| [45] | Patented | Nov. 30, 1971 |
| [73] | Assignee | Farbenfabriken Bayer Aktiengesellschaft<br>Leverkusen, Germany |

[54] MODIFIED AQUEOUS DISPERSIONS
6 Claims, No Drawings

[52] U.S. Cl. .................................................. 260/29.6,
260/29.2, 260/77.5
[51] Int. Cl. ...................................................... C08f 1/00

[50] Field of Search............................................. 260/77.5
CR, 859, 29.6 R, 29.3, 29.2

[56] References Cited
UNITED STATES PATENTS

| 3,240,740 | 3/1966 | Knapp.......................... | 260/29.6 R |
| 3,384,606 | 4/1968 | Dieterich..................... | 260/29.3 |
| 3,427,192 | 2/1969 | Bolinger....................... | 260/29.2 |

*Primary Examiner*—Julius Frome
*Assistant Examiner*—Leon Garrett
*Attorneys*—Clelle W. Upchurch and Sylvia Gosztonyi

ABSTRACT: A process for preparing modified aqueous dispersions of polymers and copolymers by reacting an aqueous dispersion of the polymers or copolymers with the reaction product of a high molecular weight compound containing at least two active hydrogen atoms and an excess of an organic polyisocyanate.

MODIFIED AQUEOUS DISPERSIONS

This invention relates to modified aqueous dispersions of polymers and copolymers and, more particularly to a process for the preparation of stable modified aqueous dispersions of polymers and copolymers.

The use of high molecular weight reaction products which contain isocyanate groups in the preparation of dispersions is already known. For example, U.S. Pat. No. 2,968,575 discloses a process for the preparation of polyurethane latices in which high molecular weight reaction products containing isocyanate groups are dispersed in an aqueous medium with the aid of emulsifiers. However, the resulting aqueous dispersions separate out when left to stand for some time, yielding a coarse precipitate which cannot be redispersed even by stirring or shaking. The dispersions rapidly become unstable, especially if branched reaction products containing isocyanate groups are used as the starting materials.

French Pat. specification No. 1,428,264 discloses a process for imparting crease-resistance to textile materials by treating them with aqueous liquors which have high molecular weight reaction products containing isocyanate groups and polymers or copolymers prepared from vinyl or divinyl monomers dispersed therein. A necessary condition for this process is the presence of free isocyanate groups for reaction with the textile material and the formation of a nonsticky dressing in the bath.

The published German Pat. application No. S28 416 39b/22/06 discloses a process for modifying aqueous dispersions of polymeric vinyl and acrylic compounds in which small quantities of monomeric polyisocyanates are added to aqueous dispersions of the polymeric vinyl compounds. In this process, the quantities of the isocyanate added to the aqueous dispersions should not exceed 5 percent. The small quantities of isocyanate added cause thickening of the aqueous dispersion and hence increase the number of ways in which the vinyl dispersions may be used.

It is therefore an object of this invention to provide a process for the preparation of stable modified aqueous dispersions of polymers and copolymers which is devoid of the foregoing disadvantages.

A further object of this invention is to provide a method for preparing stable aqueous dispersions of modified polymers and copolymers which will not separate out when left to stand for some time or yield a precipitate which cannot be redispersed by stirring or shaking.

Another object of this invention is to provide stable modified aqueous dispersions of polymers and copolymers which do not become unstable even if branched reaction products are used as the starting materials.

Still another object of this invention is to provide stable dispersions suitable for use in the production of shaped articles such as coatings, impregnations and adhesions.

Yet another object of this invention is to provide stable dispersions which have a solids content of up to about 60 percent.

The foregoing objects and others are accomplished in accordance with this invention, generally speaking, by a process which comprises preparing an aqueous dispersion of a polymer or copolymer and reacting the polymers or copolymers in the aqueous dispersion with a polymer containing free NCO groups and prepared by reacting a high molecular weight compound containing at least two active hydrogen atoms with an excess of a polyisocyanate.

The present invention relates to a process for the preparation of modified aqueous dispersions of polymers and copolymers in which an aqueous dispersion of the polymers or copolymers is reacted with a reaction product containing free NCO groups, which reaction product is obtained by reacting a high molecular weight compound containing at least two active hydrogen atoms with an excess of polyisocyanate.

The polymers or copolymers which are used in the process of the invention are prepared in any suitable known manner by radical polymerization or copolymerization of any suitable olefinic monomers in aqueous dispersion, if desired with the use of emulsifiers. Some suitable olefinic monomers which may be used include, for example:

a. a, b-olefinically unsaturated monocarboxylic acids such as acrylic acid, methacrylic acid, and the like, as well as their derivatives such as esters of acrylic and methacrylic acid with saturated monohydric aliphatic or cycloaliphatic alcohols having one to 20 carbons atoms including, for example, methyl acrylate, methyl methacrylate, hexyl acrylate, hexyl methacrylate, eicosyl acrylate, eicosyl methacrylate and the like; acrylic and methacrylic acid amides, acrylonitrile, methacrylonitrile and the like; furthermore, acids, as well as their derivatives such as esters which contain unsaturated double bonds, for instance, butenic-, pentenic-, hexenic-, hypogenic-, oleic-, elaidic-, brassidic-, behenic acid, brassidic acid methylester, oleic acid ethyl ester, behenic acid methyl ester;

b. aromatic vinyl compounds such as styrene, α-methylstyrene, dichlorostyrene and the like;

c. aliphatic vinyl compounds including vinyl ethers, vinyl esters, vinyl ketones, vinyl halides, particularly vinyl chloride, vinyl bromide, vinyl iodide, vinyl acetate, vinyl propionate, vinyl docosanoate, vinyl ether, vinyl ethyl ethers, vinyl pentyl ethers, vinyl decyl ethers, vinylidene chloride, vinylidene bromide, vinylidene fluoride, vinyl methyl ketone, vinyl ethyl ketone and the like;

d. conjugated diolefines containing four to six carbon atoms such as, for example, butadiene, isoprene, 2,3-dimethylbutadiene, chloroprene and the like;

e. methylol compounds of acrylamide and methacrylamide and derivatives thereof which have the general formula

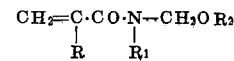

in which R represents a hydrogen atom or a methyl group, $R_1$ represents a hydrogen atom, an alkyl group such as, for example, methyl, ethyl, propyl, butyl, hexyl, heptyl, octyl, tridecyl and the like; aralkyl groups such as benzyl, a-phenyl-ethyl, a-phenylisopropyl, b-phenylisopropyl, a-(a'-naphthyl)ethyl, b-(a'-naphthyl)isobutyl, g-(a'-naphthyl)secondary butyl and the like and aryl groups such as, for example, phenyl, a-naphthyl, b-naphthyl, a-anthryl, g-anthryl indine, a-naphthene and the like, and $R_2$ represents a hydrogen atom or an alkyl or cycloalkyl group such as, for example, methyl, ethyl, n-propyl, isopropyl, n-butyl, isobutyl, any of the alkyl groups mentioned above, cyclohexyl, cycloamyl, cycloheptyl, cyclooctyl, cyclobutyl and the like; some specific compounds include those of the foregoing general formula wherein R, $R_1$ and $R_2$ are each hydrogen atoms, methyl groups, ethyl groups and propyl groups as well as those compounds wherein R and $R_1$ are methyl, while $R_2$ is hydrogen and where R and $R_1$ are hydrogen while $R_2$ is methyl or ethyl or amyl and the like. Some such suitable compounds are, for example, N-hydroxy methyl acrylamide,
N-hydroxy methyl methacrylamide,
N-methoxymethyl acrylamide,
N-methoxymethyl methacrylamide,
N-methyl-N-methoxymethyl acrylamide,
N-methyl-N-methoxymethyl methacrylamide;

f. Mannich bases of acrylamide and methacrylamide which have the general formula

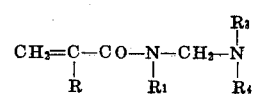

in which R and $R_1$ have the meaning already indicated above and $R_3$ and $R_4$ represent alkyl, cycloalkyl or aralkyl groups as set forth above for $R_1$ and $R_2$, or form part of a nitrogen-containing heterocyclic radical, such as, for example, a morpholine radical. Some such suitable compounds are, for example N-dimethylaminomethyl acrylamide,
N-dimethylaminomethyl methacrylamide,
N-dimethylaminomethyl-N-methyl acrylamide,
N-dimethylaminomethyl-N-methacrylamide.

Particularly preferred polymers are those which contain groups capable of reacting with isocyanates including, for example, the polymers or copolymers prepared from acrylic acid, methacrylic acid, their hydroxyalkyl esters or amides, and the like. Some such suitable compounds, are, for example, a copolymer made from
60 parts of butyl acrylate
30 parts of styrol
10 parts of acrylamide
a graft polymer made from
10 parts of polybutadiene as graft basis
20 parts of styrol
60 parts of butyl acrylate
10 parts of acrylamide Particularly suitable are aqueous dispersions of self-crosslinking copolymers obtained by the copolymerization of the ethylenically unsaturated monomers mentioned under e. and f. above with other ethylenically unsaturated monomers such as, for example, a copolymer made from
80 parts of butyl acrylate,
10 parts of β-hydroxy ethyl acrylate,
10 parts of N-methoxy methyl methacrylate In the preparation of the reaction products containing NCO groups to be used in the invention, high molecular weight polyols are particularly preferred. Any such suitable polyols may be used including, for example, polyethylene glycols, polypropylene glycols, polybutylene glycols, polyhexylene glycols or mixed polymers of alkylene glycols, and polythioethers which are obtainable, for example, by the condensation of thiodiglycol either alone or with sulphur-free polyalcohols. Further suitable polyols are polyesters prepared by reacting aliphatic dicarboxylic acids such as succinic acid, adipic acid, sebacic acid, maleic acid and the like with polyalcohols such as, for example, ethylene glycol, diethylene glycol, propylene glycol, butanediol, neopentyl glycol and the like. Some other suitable polyols which may be used are, for example, those listed in U.S. Pat. No. 3,124,605. The molecular weights of the polyols are preferably between about 500 and about 10,000, and particularly between about 800 and about 4000.

Other compounds which contain at least two active hydrogen atoms and which may be used in the preparation of the reaction products containing NCO groups are organopolysiloxanes which may have molecular weights of up to about 25,000. Any such suitable organopolysiloxanes may be used such as, for example, compounds of the general formula:

$$R_n SiO_{\frac{4-n}{2}}$$

in which n is greater than 1 and not more than 3 and in which each substituent R is one of the radicals R', —X—Y or

where R' represents an aliphatic, cycloaliphatic or aromatic organic radical such as those set forth hereinbefore which may, if desired, carry an inert substituent such as those listed in U.S. Pat. No. 3,124,605, X represents an aliphatic or araliphatic bifunctional or trifunctional radical which may contain an ether group, a thioether group, an ester or an amino group such as, for example, —CH$_2$—, —CH$_2$—CH$_2$—, —CH$_2$—CH$_2$—Ch$_2$—, —CH$_2$—O—CH$_2$—, —CH$_2$—S—Ch$_2$—, —CH$_2$—NH—CH$_2$—, —CH$_2$—COO—CH$_2$—CH$_2$—, —CH$_2$—O—CH(CH$_2$—)$_2$, —CH$_2$—N(CH$_2$—)$_2$
and Y represents a hydroxyl, sulphydryl, carboxyl, carbonamide, or a secondary amino group, with the proviso that at least two siloxane units correspond to the formula

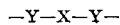

in which R¹, X and Y have the meaning indicated above, m is either 1 or 2 and the substituents R in the remaining siloxane units are exclusively the radicals R'.

The specific preferred polysiloxanes within the scope of the formula include, for example:
HO-CH$_2$-Si(CH$_3$)$_2$-O-[Si(CH$_3$)$_2$-o]$_z$-Si(CH$_3$)$_2$-CH$_2$OH,
wherein z=4 to 130 and preferably 4, HS-CH$_2$-Si(CH$_3$)$_2$-o-[Si(CH$_3$)B2-o]$_{10}$-Si(CH$_3$)$_2$-CH$_2$SH-CH$_3$(CH$_2$)$_3$-NH-CH$_2$-Si(CH$_3$)$_2$o-[Si(CH$_3$)$_2$-o]$_{11}$-Si(CH$_3$)$_2$-CH$_2$NH-(CH$_2$)$_3$-CH$_3$.

In addition to the foregoing high molecular weight compounds containing at least two active hydrogen atoms, low molecular weight polyalcohols may also be employed in the preparation of the starting materials containing NCO groups in the process of this invention. Any suitable low molecular weight polyalcohol may be used such as, for example, glycols including diethylene glycol, propylene glycol, butylene glycol, neopentyl glycol and the like; triols such as, for example, glycerol, trimethylol, propane and the like as well as any of those low molecular weight polyalcohols set forth in U.S. Pat. No. 3,124,605.

Any suitable polyisocyanate may be used in the preparation of the starting materials containing NCO groups in accordance with this invention such as, for example, aliphatic, cycloaliphatic or aromatic polyisocyanates. Some such suitable isocyanates are, for example, aliphatic or cycloaliphatic diisocyanates including tetramethylene diisocyanate, hexamethylene diisocyanate, 1,4-cyclohexane diisocyanate, 4,4'-dicyclohexylmethane diisocyanate, 2,4- and 2,6-hexahydrotolylene diisocyanate, triisocyanates such as, for example, the reaction product of 3 mols of hexamethylene diisocyanate and 1 mol of water having the formula OCN—(CH$_2$)$_6$—N—[CONH-(CH$_2$)$_6$-NCO]$_2$; aromatic polyisocyanates including 2,4- and 2,6-tolylene diisocyanate, isomeric mixtures thereof, 1,4- and 1,3-phenylene diisocyanate, 4,4'-diphenylmethane diisocyanate, 1,5-naphthylene diisocyanate and the like as well as any of those isocyanates set forth in Canadian Pat. No. 698,636.

The starting material containing free isocyanate groups may be prepared in any suitable known manner such as, for example, by heating the polyisocyanates with the high molecular weight compounds which contain at least two active hydrogen atoms, preferably to temperatures between about 60°, and about 130° C. In this process, the components may be reacted in such a ratio that considerably more than two isocyanate groups are added for each active hydrogen atom present. In such a case, the polyisocyanates remaining after the reaction has been completed must be substantially removed in any suitable manner such as, for example, by distillation in vacuo. Alternatively, the components may be added to one another in such a proportion that there are more than one, but not substantially more than two isocyanate groups for each active hydrogen atom. The reaction mixture may then be heated until the isocyanate group content thereof corresponds approximately to the theoretical value for the complete reaction of the active hydrogen atoms. The viscosity of the reaction products obtained in the latter procedure is higher than the viscosity of the reaction products obtained with the former procedure. In any event, the isocyanate content of the NCO containing reaction products to be used in the instant process is preferably from about 2 to about 8 percent by weight.

In order to carry out the process of this invention, an aqueous emulsion of the reaction products which contain NCO groups is prepared. The viscosity of these reaction products is adjusted to a low value, if necessary with the addition of inert, nonhydrophilic solvents such as benzene, toluene, ethyl acetate, benzene, chlorinated hydrocarbons and the like, and they are emulsified with the aid of a high speed stirrer in water in which emulsifiers are dissolved. Any suitable anionic and cationic or even nonionic emulsifying agents may be used for this operation; they should be similar in nature to the emulsifiers used in the preparation of the aqueous polymer or copolymer dispersions.

Some such suitable anionic emulsifiers are, for example, salts of long chained aliphatic monocarboxylic acids (fatty acids, resinic acids), salts of acidic aliphatic sulfuric acid esters, salts of aliphatic sulfonic acids and of araliphatic sulfonic acids, salts of fatty acid condensation products with hydroxyalkylcarboxylic acids or aminoalkyl carboxylic acids, the salts of sulfonated ethylene oxide adducts and the like.

Some suitable cationic emulsifiers are, for example, salts of alkylamines, arylamines, alkylarylamines, resinic amines; inorganic or organic acids, the salts of quaternary ammonium compounds and the like.

Some suitable nonionic emulsifiers which may be used are the reaction products of ethylene oxide with long chained aliphatic alcohols or with phenols; the reaction products which contain more than 10 ethylene oxide units are preferred. The quantity of emulsifier which is used is between about 0.5 and about 10 percent by weight, based on the isocyanate prepolymer used in the process of the invention.

The resulting emulsion of the NCO-containing prepolymers is then stirred into the aqueous dispersion of the polymers or copolymers. This mixture is then left to stand until its free NCO content has dropped to zero, a process which may require from about 3 to about 10 days, depending on the nature of polyisocyanate and the solvent used in the reaction system. In many cases, a considerable increase in viscosity of the mixture takes place during this time.

Stable dispersions which may have a solids content of up to about 60 percent can be prepared in this way. The ratio of NCO-containing prepolymer to the polymer or copolymer of ethylenically unsaturated monomers may vary within wide limits in order to obtain a dispersion with a solids content on the order of up to about 60 percent. For example, the ratio of NCO-containing prepolymer to the polymer or copolymer of ethylenically unsaturated monomers may range from about 0.1:1 to about 2:1.

In another embodiment of this invention, the NCO-containing prepolymer is emulsified directly into the aqueous dispersion of the polymer or copolymer instead of being itself in the form of a finished emulsion.

The modified polymer and copolymer dispersions obtained according to the invention are stable and can be diluted with water in any proportion. In some of those cases in which the dispersions have a high solids content, some material may deposit or settle out after a period of time; however, redispersion can be readily achieved by simply shaking the dispersion.

The dispersions of this invention are suitable for use in the production of any shaped articles such as coatings, impregnations and adhesions. They are preferably used in the textile industry where, for example, excellently wear resistant and crease-proof finishes can be obtained by using commercial crease-resisting agents based on urea-formaldehyde polymers or melamine-formaldehyde polymers together with the polymer or copolymer dispersion of this invention. The bonding of fleeces to strengthen them in the formation of low crease, dimensionally stable fleeces is another use for the dispersions of this invention.

The invention is further illustrated but is not intended to be limited by the following examples in which all parts and percentages are by weight unless otherwise specified.

PREPARATION OF THE NCO-CONTAINING PREPOLYMERS

A1. About 1000 parts of polybutylene glycol (molecular weight 895; OH number 125) are dehydrated in vacuo under suction at about 130° C. for about 30 minutes. About 1500 parts of hexamethylene diisocyanate are added and the mixture is heated in an atmosphere of nitrogen for about 2 hours at about 110° C. Excess diisocyanate is then removed in a thin layer evaporator at about 160° C. and about 0.1 mm. Hg. The resulting product, which has an NCO content of 6.6 percent by weight, solidifies after several days to form a waxy mass.

A2. About 3000 parts of a branched polypropylene glycol (molecular weight about 3000, OH number about 56, acid number <0.5) are heated with about 535 parts of hexamethylene diisocyanate for about 2 hours at about 110° C. while a stream of nitrogen is passed over it, and the reaction mixture is then heated for about another 1½ hours at about 130° C. to about 150° C. The reaction product has an NCO content of from about 3.6 to about 3.7 percent and a viscosity of from about 2900 to about 3300 cP/25° C.

A3. About 1000 parts of an organopolysiloxane having the formula:

HO-CH$_2$-Si(CH$_3$)$_2$-[O-Si(CH$_3$)$_2$-]$_{15}$-O- Si(CH$_3$)$_2$CH$_2$OH and containing about 2.7 percent by weight of hydroxyl groups are mixed with about 1000 parts of hexamethylenediisocyanate and heated in an atmosphere of nitrogen for about 2 hours at about 120° C. Excess diisocyanate is then removed in a thin layer evaporator at about 160° C. and about 0.1 mm. Hg. The product contains about 5.7 percent of NCO and has a viscosity of about 138 cP/25° C.

A4. About 1000 parts of a branched polypropylene-polyethylene glycol (molecular weight about 2500) prepared by alternate polymerization of about 80 parts of propylene oxide and about 20 parts of ethylene oxide on glycerol as the starting molecule, are heated with about 850 parts of hexamethylene diisocyanate for about 3 hours at about 110° C. Excess diisocyanate is then removed at about 160° C. in a thin layer evaporator at about 0.1 mm. Hg.

A5. A prepolymer containing about 7.1 percent of free isocyanate groups is prepared in a manner analogous to that described in (A4) from about 1000 parts of a branched polypropylene-polyethylene glycol (molecular weight about 1200) prepared by the copolymerization of about 75 parts of propylene oxide and about 25 parts of ethylene oxide on glycerol as the starting molecule and about 1500 parts of hexamethylene diisocyanate.

EXAMPLE 1

About 100 parts of toluene and about 200 parts of petroleum ether (boiling range about 100° to about 140° C.) are added to about 800 parts of (A1), and the solution is then emulsified in about 900 parts of water to which about 10 parts of a commercial surface-active paraffin sulfonate have been added with the aid of a high speed stirrer.

About 250 parts of this approximately 40 percent aqueous emulsion are stirred together with about 2000 parts of the approximately 40 percent aqueous dispersion of a copolymer made up of about 60 parts of butyl acrylate, about 30 parts of styrene and about 10 parts of acrylamide. When the reaction mixture has been left to stand for about 8 days, about a 40 percent aqueous dispersion is obtained which can be diluted with water in any proportion and can be stored for months without undergoing any change. For use of the dispersion, see example 4.

EXAMPLE 2

About 500 parts of (A1) are mixed with about 2000 parts of about a 40 percent aqueous dispersion of a graft copolymer made up of about 10 parts of polybutadiene (as the graft basis), about 20 parts of styrene, about 60 parts of butyl acrylate and about 10 parts of acrylamide. When the reaction mixture has been left to stand for several days, a stable, aqueous dispersion is obtained.

EXAMPLE 3

About a 50 percent emulsion is prepared from about 250 parts of (A2) to which have been added about 50 parts of ethyl acetate to reduce the viscosity, and about 200 parts of water containing about two parts of a commercial surface-active paraffin sulfonate, and about 100 parts of this emulsion are mixed with about 1000 parts of the approximately 40 percent aqueous dispersion of the copolymer of example 1. After standing for several days, a stable, aqueous dispersion is obtained which, in combination with cyclic ethylene ureas containing methylol groups, is eminently suitable for crease proofing textiles which are based on cellulose. For use of the dispersion, see example 4.

A stable dispersion having a higher (A2) content can be prepared by mixing the two components together in the ratio of from about 1:1 to about 2:1 and leaving the mixture to stand. Solids may be deposited in the course of time but can easily be redispersed by shaking.

EXAMPLE 4

About a 40 percent emulsion is prepared in the usual way with the aid of a high speed stirrer from about 1000 parts of (A3), about 125 parts of toluene, about 250 parts of petroleum ether (boiling range from about 100° to about 140° C.), about 1112 parts of water and about 13 parts of a commercial surface active paraffin sulfonate.

About 250 parts of the emulsion are mixed with about 1000 parts of the about 40 percent aqueous dispersion of a copolymer made up of about 95 parts of butyl acrylate and about 5 parts of acrylamide and left to stand for several days. The stable dispersion then obtained can be used as a finish on textiles, providing a pleasant soft, full touch.

The stable dispersions obtained in examples 1, 3 and 4 may be used as dressing agents for improving the abrasion resistance of textile fabrics based on cellulose. They are applied by padding in the form of a composition having the following components:

About 100 parts/liter of dimethylol ethylene urea
About 10 parts/liter of magnesium chloride
About 100 parts/liter of the dispersion described in examples 1,2 or 4 (solids content).

The fabrics are dried for about 10 minutes at about 110° C. and then condensed for about 5 minutes at about 150° C.

The improvement in the finish obtained is illustrated in the following tables:

TABLE 1

| Cotton Poplins | Untreated Fabrics | Fabrics treated with Dispersions Described in Examples | | |
|---|---|---|---|---|
| | | 1 | 3 | 4 |
| Dry Crease Angle | | | | |
| Warp | 75° | 158° | 167° | 163° |
| Weft | 63° | 170° | 171° | 175° |
| Wet Crease Angle | | | | |
| Warp | 54° | 147° | 132° | 142° |
| Weft | 67° | 148° | 130° | 143° |
| Abrasion Resistance According to Schopper (Revolutions) | 190 | 730 | 450 | 350 |

TABLE 2

| Rayon | Untreated Fabrics | Fabrics treated with Dispersions Described in Examples | | |
|---|---|---|---|---|
| | | 1 | 3 | 4 |
| Dry Crease Angle | | | | |
| Warp | 104° | 159° | 159° | 158° |
| Weft | 114° | 157° | 160° | 170° |
| Wet Crease Angle | | | | |
| Warp | 47° | 140° | 130° | 132° |
| Weft | 53° | 142° | 136° | 124° |

EXAMPLE 5

About a 40 percent emulsion is prepared with the aid of a high speed stirrer from about 800 parts of (A4), about 100 parts of toluene, about 200 parts of petroleum ether (boiling range about 100° to about 140° C.), about 445 parts of water and about 5 parts of a commercial surface active paraffin sulfonate. About 125 parts of the emulsion are mixed with about 1000 parts of the 40 percent aqueous dispersion of the copolymer used in example 1 and left to stand for about 5 days. The resulting stable dispersion is used for strengthening fleeces. For use of the dispersion, see example 6.

EXAMPLE 6

As in example 5, a stable dispersion which is used for strengthening fleeces is prepared from (A5) and the aqueous copolymer dispersion described in example 1.

A fiber fleece of cuprammonium cellulose of 18 g./m.$^2$ is treated with the stable aqueous dispersions of example 5 or 6. After impregnation, the fleece is squeezed out to reduce the liquor content to about 100 percent and is dried at about 70° C.

For comparison, the same fiber fleece is treated in the same way but only with the 40 percent aqueous dispersion of the copolymer described in example 1.

The fleece materials obtained from the three experiments are tested for their crease recovery angle according to DIN 53890. The following values are obtained:

TABLE 3

| | Comparison test | With dispersion according to example | |
|---|---|---|---|
| | | 5 | 6 |
| Crease Angle After 5' | | | |
| Longitudinal direction | 61° | 94° | 96° |
| Transverse direction | 84° | 112° | 110° |
| Crease Angle After 60' | | | |
| Longitudinal direction | 80° | 118° | 119° |
| Transverse direction | 104° | 138° | 131° |

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

We claim:

1. A process for the preparation of stable, modified aqueous dispersions of copolymers which comprises preparing an aqueous dispersion of (I) copolymer prepared from
   a. ethylenically unsaturated monomers containing NCO reactive hydrogen atoms, said monomers being selected from the group consisting of (1) acrylic acid, (2) methacrylic acid, (3) hydroxyl alkyl esters of acrylic acid or methacrylic acid, (4) N-dialkyl amino methyl amides of acrylic acid or methacrylic acid, (5) N-alkoxy methyl compounds of acrylamide or methacrylamide, (6) acrylamide, (7) methacrylamide and (8) N-hydroxy methyl amides of acrylic acid or methacrylic acid, and
   b. ethylenically unsaturated monomers free of NCO reactive hydrogen atoms, said monomers being selected from the group consisting of aromatic vinyl compounds, conjugated diolefins containing four to six carbon atoms, Mannich bases of acrylamide and methacrylamide, nitriles and esters of $a$, $b$ — olefinically unsaturated monocarboxylic acids and reacting said aqueous dispersion with (II) an NCO containing prepolymer prepared by reacting an excess of an organic polyisocyanate with a polyol containing at least two active hydrogen atoms which are reactive with NCO groups, said polyol being selected from this group consisting of
   a. silicon free polyhydroxyl compounds having a molecular weight of 500 to 10,000, and
   b. organo polysiloxanes having a molecular weight of up to about 25,000.

2. The process of claim 1 wherein the copolymer is obtained by copolymerizing Mannich bases of acrylamide and methacrylamide with methylol compounds of acrylamide and methacrylamide.

3. The process of claim 1 wherein the prepolymer is prepared by reacting an organopolysiloxane having a molecular weight of up to 25,000 and containing at least two groups which are reactive with NCO groups with an organic polyisocyanate.

4. The process of claim 1 wherein the prepolymer is prepared by reacting an organic polyisocyanate with a high molecular weight compound containing at least two groups which are reactive with NCO groups and a low molecular weight polyalcohol having a molecular weight from 50.0 to 10,000.

5. The process of claim 1 wherein an aqueous emulsion of the prepolymer is prepared, the resulting emulsion is stirred into the aqueous dispersion of the copolymers and the mixture is left to stand until the free NCO content thereof has dropped to substantially zero.

6. The process of claim 1 wherein the ratio of the prepolymer to the copolymer is from about 0.1:1 to about 2:1.

* * * * *